US010054129B2

(12) United States Patent
Miyahara et al.

(10) Patent No.: US 10,054,129 B2
(45) Date of Patent: Aug. 21, 2018

(54) SUPPORT APPARATUS FOR BALANCE CORRECTION

(71) Applicants: IHI COMPRESSOR AND MACHINERY CO., LTD., Tokyo (JP); IHI CORPORATION, Tokyo (JP)

(72) Inventors: Kazumasa Miyahara, Tokyo (JP); Masayuki Kubota, Tokyo (JP); Yukihiro Maeda, Tokyo (JP); Toshifumi Kitanobo, Osaka (JP); Yoshio Shimokura, Osaka (JP); Yutaka Hirata, Tokyo (JP); Taketo Maruyama, Tokyo (JP); Ken Nakano, Tokyo (JP); Hisayuki Motoi, Tokyo (JP); Naomichi Oomori, Tokyo (JP)

(73) Assignee: IHI ROTATING MACHINERY ENGINERING CO., LTD., Tokyo (JP)

( * ) Notice: Subject to any disclaimer, the term of this patent is extended or adjusted under 35 U.S.C. 154(b) by 64 days.

(21) Appl. No.: 15/219,532

(22) Filed: Jul. 26, 2016

(65) Prior Publication Data

US 2016/0333888 A1 Nov. 17, 2016

Related U.S. Application Data

(63) Continuation of application No. PCT/JP2015/058006, filed on Mar. 18, 2015.

(30) Foreign Application Priority Data

Mar. 24, 2014 (JP) .................................. 2014-059607

(51) Int. Cl.
*G01M 1/04* (2006.01)
*F04D 29/051* (2006.01)
(Continued)

(52) U.S. Cl.
CPC ......... *F04D 29/051* (2013.01); *F04D 29/056* (2013.01); *F04D 29/284* (2013.01);
(Continued)

(58) Field of Classification Search
CPC ............................ G01M 1/04; F16C 32/0614
See application file for complete search history.

(56) References Cited

U.S. PATENT DOCUMENTS 4,543,825 A * 10/1985 Schonfeld ............... G01M 1/04
73/459
5,067,349 A * 11/1991 Hirchert .................. G01M 1/04
73/471
(Continued)

FOREIGN PATENT DOCUMENTS

CN 103512706 A 1/2014
EP 1693660 A1 8/2006
(Continued)

OTHER PUBLICATIONS

Extended European Search Report, European Patent Application No. 15769401.9 Oct. 20, 2017, 8 pgs.

*Primary Examiner* — Thomas R Hannon
(74) *Attorney, Agent, or Firm* — Volpe and Koenig, P.C.

(57) ABSTRACT

A support apparatus for balance correction of a rotated body having an end face in a direction intersecting a rotation center and having a support hole in a rotation center portion of the end face includes a vertical mandrel inserted into the rotated body from a vertical direction by being fitted in the support hole; a fluid radial bearing provided on an outer circumferential surface of the mandrel and adapted to rotatably receive an inner surface of the support hole by means of a fluid ejected from the outer circumferential surface of the mandrel; and a fluid thrust bearing placed around the (Continued)

mandrel and adapted to eject the fluid to an end face of the rotated body and thereby float the rotated body.

9 Claims, 5 Drawing Sheets

(51) Int. Cl.
    *F04D 29/056*     (2006.01)
    *F04D 29/28*     (2006.01)
    *F16M 11/08*     (2006.01)
    *F16M 13/02*     (2006.01)
    *F16C 32/06*     (2006.01)

(52) U.S. Cl.
    CPC ............ *F16M 11/08* (2013.01); *F16M 13/02* (2013.01); *G01M 1/04* (2013.01); *F05B 2240/54* (2013.01); *F16C 32/0614* (2013.01); *F16M 2200/041* (2013.01)

(56) References Cited

U.S. PATENT DOCUMENTS

| | | | | |
|---|---|---|---|---|
| 7,040,867 B2 * | 5/2006 | Louthan | ................ | F01D 5/025 |
| | | | | 416/244 A |
| 7,360,420 B2 * | 4/2008 | Thelen | .................... | G01M 1/04 |
| | | | | 73/471 |
| 7,658,107 B2 * | 2/2010 | Mitsubori | ........... | F16C 32/0696 |
| | | | | 73/455 |

FOREIGN PATENT DOCUMENTS

| | | | |
|---|---|---|---|
| EP | 2891873 B1 * | 7/2017 | |
| JP | 2005-172537 A | 6/2005 | |
| JP | 2011-247837 A | 12/2011 | |
| WO | 2014/034769 A1 | 3/2014 | |

* cited by examiner

SUPPORT APPARATUS FOR BALANCE CORRECTION

BACKGROUND

Technical Field

Embodiments described herein relate to a support apparatus for balance correction, where in making balance corrections of a rotating rotated body such as a rotor of a turbocompressor the support apparatus rotatably supports the rotated body using a vertical mandrel.

Description of the Related Art

With a rotating rotor (which corresponds to a rotated body according to the present application) of a turbocompressor, to solve imbalance (dynamic unbalance) caused by part tolerances during production, conventionally, an amount of the imbalance is measured and then the imbalance is corrected using a balance correction apparatus.

To measure the amount of imbalance with high accuracy, the balance correction apparatus uses a support apparatus (support apparatus for balance correction) adapted to rotatably support a rotor alone using a vertical mandrel. Regarding the mandrel, in many cases, as disclosed in Japanese Patent Laid-Open No. 2005-172537, a columnar mandrel fitted in a support hole located in a rotation center portion of the rotor is used, the support hole having a circular cross section, and the mandrel is structured such that a fluid radial bearing will be provided on an outer circumferential surface of the mandrel and that a fluid thrust bearing will be provided on a base end side of the mandrel.

With this structure, when the support hole in the rotor is fitted over the mandrel, the entire rotor is put on the mandrel. Subsequently, as a fluid (e.g., air) is ejected to an inner surface of the support hole through an ejection hole in the fluid radial bearing and the fluid (e.g., air) is ejected to an opening edge portion of the support hole through an ejection hole in the fluid thrust bearing, the rotor is rotatably supported around the mandrel while floating.

To measure the amount of imbalance (amount of dynamic unbalance), the rotor is rotated by giving a turning force from outside to the rotor in a floating state, for example, by ejecting a driving fluid (e.g., air) to blades, and then behavior of the rotating rotor is measured using various sensors provided on the balance correction apparatus.

However, the rotor is supported by the fluid radial bearing in a radial direction of the rotor in a small area in lower part of the rotor and the rotor is supported by the fluid thrust bearing in a thrust direction of the rotor in a narrow area compared to an outside diameter of a workpiece. Consequently, when the amount of imbalance of the rotor is excessive, the rotor inclines and measurement accuracy of the amount of imbalance degrades, making it difficult to measure the amount of imbalance properly. In the case of a rotor liable to cause excessive imbalance, in particular, i.e., a rotor whose center of gravity position is higher than a position at which the rotor is supported by the fluid radial bearing, the measurement accuracy tends to degrade.

SUMMARY

An object of the present disclosure is to provide a support apparatus for balance correction, where the support apparatus is capable of measuring an amount of imbalance of a rotated body with high accuracy even when an excessive amount of imbalance occurs.

The present disclosure is directed to providing a support apparatus for balance correction, the support apparatus including a fluid thrust bearing adapted to rotatably support a rotated body having an end face in a direction intersecting a rotation center, wherein the fluid thrust bearing supports the rotated body at a position from an intermediate portion between the rotation center of the rotated body and an outer circumferential end of the rotated body to the outer circumferential end on the end face of the rotated body.

Further, the present disclosure is directed to providing a support apparatus for balance correction of a rotated body which has an end face in a direction intersecting a rotation center and has a support hole in a central portion of the end face, the support apparatus including: a vertical mandrel inserted into the rotated body from a vertical direction by being fitted in the support hole; a fluid radial bearing provided on an outer circumferential surface of the mandrel and adapted to rotatably receive an inner surface of the support hole by means of a fluid ejected from the outer circumferential surface of the mandrel; and a fluid thrust bearing placed around the mandrel and adapted to eject the fluid to a region from an intermediate portion between the rotation center of the rotated body and an outer circumferential end of the rotated body to the outer circumferential end on the end face of the rotated body and thereby float the rotated body.

Also, the present disclosure is directed to providing a support apparatus for balance correction of a rotated body which has an end face in a direction intersecting a rotation center and has a boss in a central portion of the end face, the support apparatus including: a vertical mandrel provided with a recess which allows fitting and insertion of the boss of the rotated body and inserted into the rotated body from a vertical direction by fitting between the boss and the recess; a fluid radial bearing provided in an inner circumferential surface of the recess and adapted to rotatably receive an outer circumferential surface of the boss by means of a fluid ejected from the inner circumferential surface of the recess; and a fluid thrust bearing placed around the mandrel and adapted to eject the fluid to a region from an intermediate portion between the rotation center of the rotated body and an outer circumferential end of the rotated body to the outer circumferential end on the end face of the rotated body and thereby float the rotated body.

According to the present disclosure, which allows support rigidity of the rotated body to be increased in a thrust direction, the rotated body can maintain a stable posture without inclining even when an excessive amount of imbalance occurs.

Thus, even when an excessive amount of imbalance occurs, the amount of imbalance of the rotated body can be measured with high accuracy.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION OF THE EMBODIMENTS

The present disclosure will be described below based on a first embodiment shown in FIGS. 1 to 4.

Figure 1:
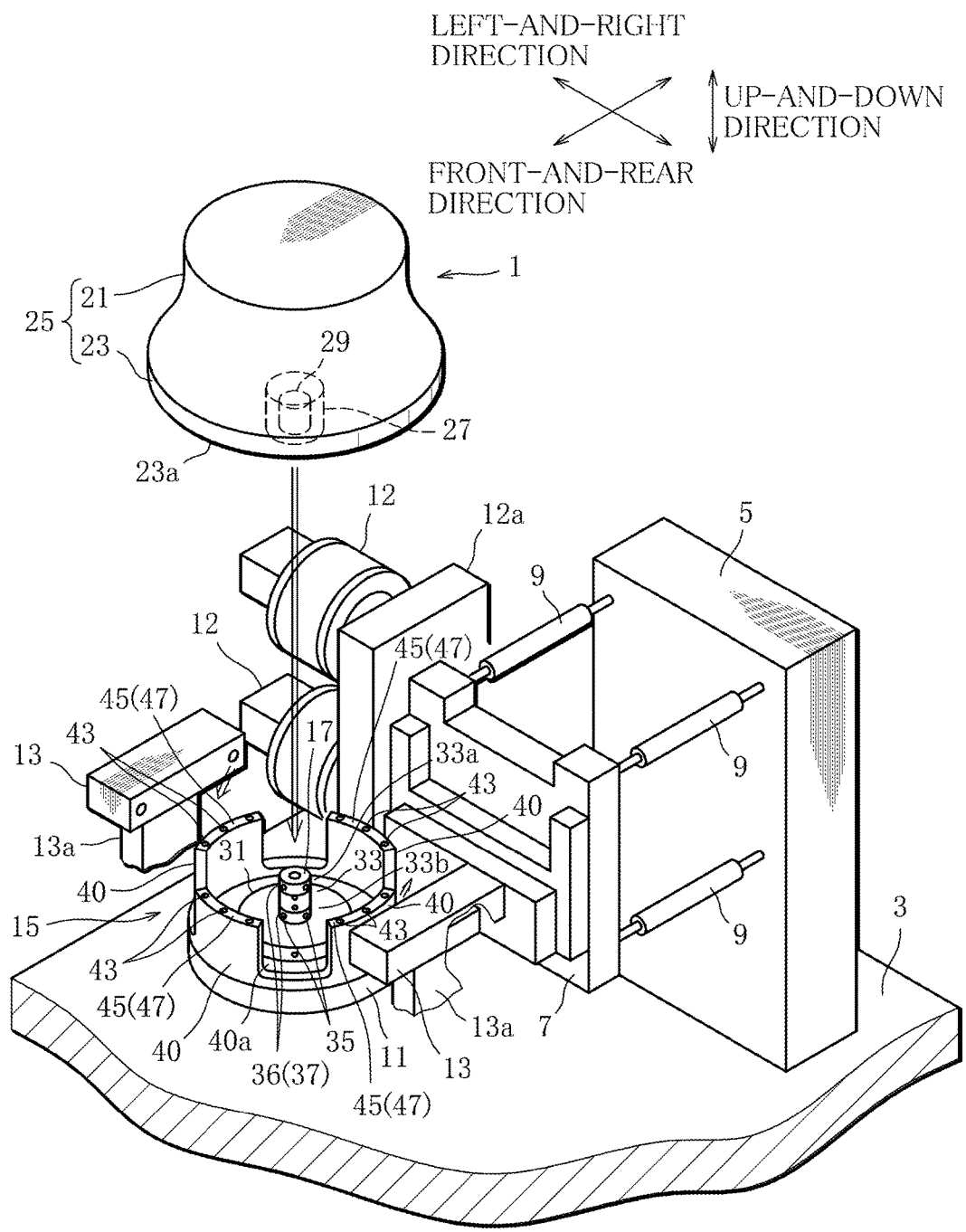
FIG. 1 is a perspective view showing a support apparatus for balance correction according to a first embodiment of the present disclosure together with a balance correction apparatus resulting from application of the support apparatus.

The perspective view of FIG. 1 shows a schematic configuration of a balance correction apparatus adapted to measure an amount of imbalance (dynamic unbalance) of a rotated body such as a rotor 1 (e.g., a compressor rotor, in this case) of a turbocompressor, where, for example, reference numeral 3 denotes a substrate of the apparatus, reference numeral 5 denotes a skeleton frame erected on a top of the substrate 3, and reference numeral 7 denotes a vibration bridge body placed in front of the skeleton frame 5.

The vibration bridge body 7 is connected to a plurality of support spring members 9 protruding from the front of the skeleton frame 5 as well as to support spring members (not shown) protruding from a top face of a substrate 3. Consequently, the entire vibration bridge body 7 is supported displaceably in a left-and-right direction. A support arm body 11 protrudes from front part of the vibration bridge body 7. A front end portion of the support arm body 11 is formed into a flat shape. A support apparatus 15 (equivalent to a support apparatus for balance correction according to the present application) intended to support the rotor 1 of the turbocompressor is mounted on a top face of the front end portion of the support arm body 11.

Incidentally, various sensors 12 adapted to detect vibrations transmitted to the vibration bridge body 7 is installed on a lateral side of the vibration bridge body 7. A pair of ejection heads 13 adapted to eject a fluid such as compressed air for rotating the rotor 1 is installed around the support apparatus 15. Incidentally, reference numeral 12a in FIG. 1 denotes a mounting member used to mount various sensors 12 on the substrate 3 and reference numeral 13a denotes a mounting member used to mount the ejection heads 13 on the substrate 3.

Figure 2:
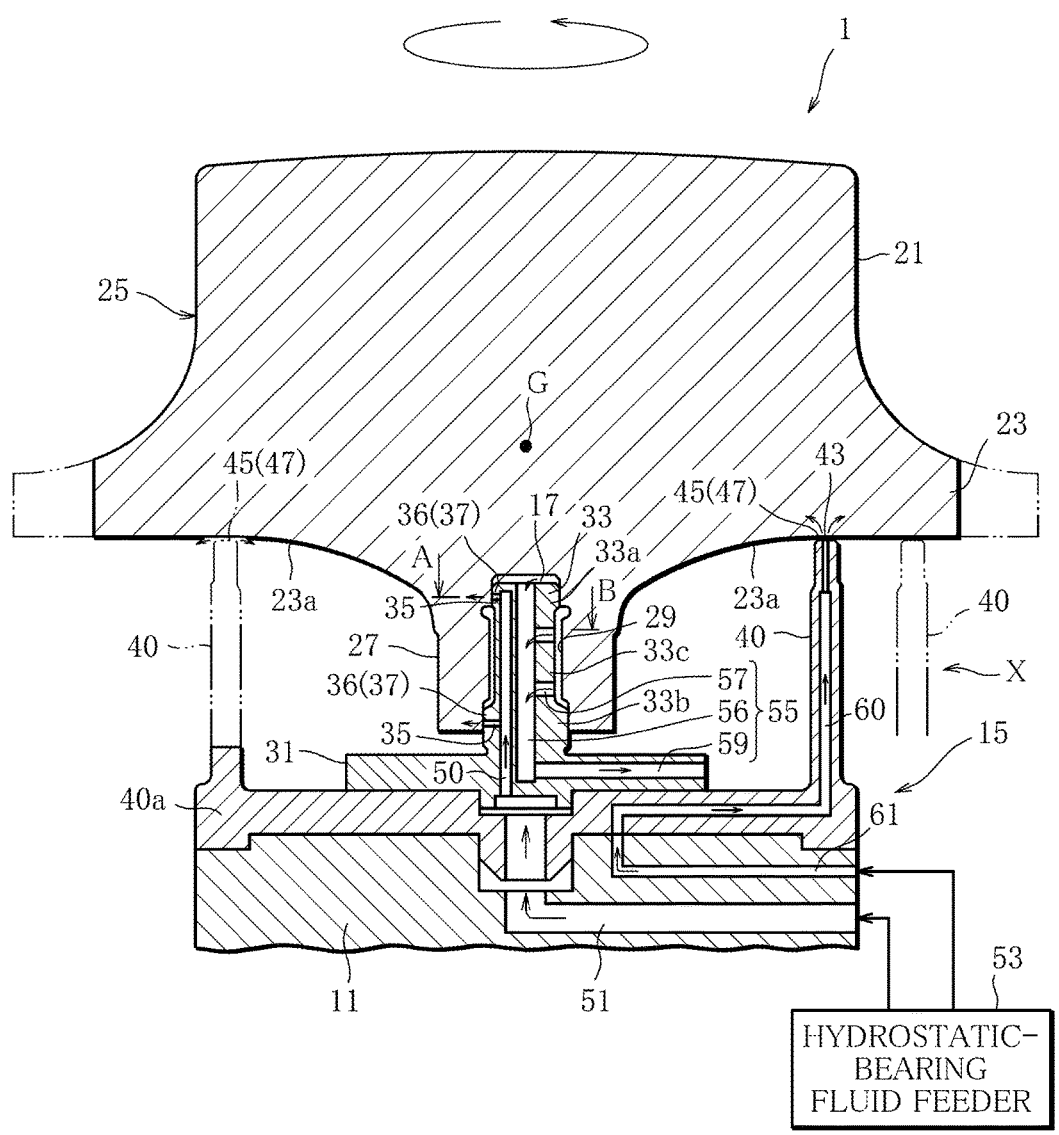
FIG. 2 is a sectional view showing a structure of various parts of the support apparatus for balance correction under a condition in which a rotor (rotated body) is mounted on a mandrel.

A structure for rotatably supporting a rotor 1 (as a discrete unit) using a vertical mandrel 17 is used for the support apparatus 15. The cross sections in FIGS. 2 to 4 show structures of various parts of the support apparatus 15.

Now, before describing the support apparatus 15, the rotor 1, which is a component to be measured, will be described. As shown, for example, in FIGS. 1 and 2, the rotor 1 includes a rotor body 25 made up of a large number of blades 21 (illustrated in FIGS. 1 and 2 in a simplified form) integrally formed on a disk-shaped base portion 23. An axis passing through a center of the base portion 23 serves as a rotation center of the rotor 1. Incidentally, an undersurface of base portion 23 is an end face 23a intersecting the rotation center of the rotor 1. A cylindrical boss 27 is formed integrally with a central portion (rotation center) of the end face 23a. A support hole 29 is formed in the boss 27 to assemble the boss 27 with a non-illustrated shaft. Here, the support hole 29 is formed of a closed-end space with a circular cross section, extending linearly from a front end of the boss 27 to a position below a center of gravity position G located in a center of the rotor 1 (FIG. 2). Consequently, the rotor 1 has a structure with high mechanical rigidity and reduced inner space. Of course, the support hole 29 may penetrate the rotor body 25 from a lower end of the boss 27 to an upper end of the rotor body 25.

Returning to the support apparatus 15, various parts of the support apparatus 15 will be described with reference to FIGS. 1 and 2. The mandrel 17 includes a circular installation seat 31 placed on a top face of the support arm body 11 and a fitting and inserting portion 33 protruding in the vertical direction from a central portion of the installation seat 31. The fitting and inserting portion 33 has a columnar shape which can be fitted and inserted in the support hole 29. That is, the mandrel 17 is structured to be inserted into the rotor 1 in the vertical direction by being fitted into the support hole 29. Incidentally, the fitting and inserting portion 33 is set to be thinner, for example, in middle portion than in other parts, i.e., upper and lower portions.

Figure 3:
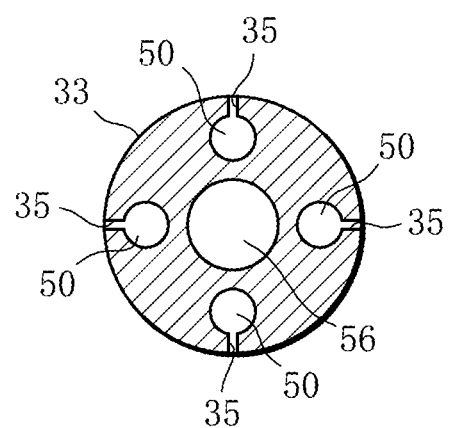
FIG. 3 is a horizontal sectional view of the mandrel taken along line A in FIG. 2.
Figure 4:
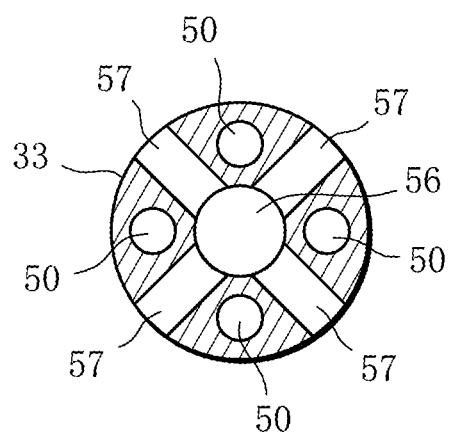
FIG. 4 is a horizontal sectional view of the mandrel taken along line B in FIG. 2.

On each of outer circumferential surfaces of the upper and lower portions 33a and 33b of the fitting and inserting portion 33, as also shown in FIG. 3, plural ejection holes, e.g., four ejection holes 35, are provided at equal intervals in a circumferential direction. Consequently, respective fluid radial bearing surfaces 36 are formed on outer circumferential surfaces of the upper and lower portions 33a and 33b. This makes up a fluid radial bearing 37 adapted to receive an inner surface of the support hole 29.

Plural walls, e.g., four arc-shaped walls 40, are placed around the mandrel 17, surrounding the mandrel 17 in a circle. All the walls 40 are placed on a same circumference, centering on an axis of the mandrel 17. Incidentally, the walls 40 protrude upward from a support seat 40a placed between the support arm body 11 and installation seat 31. All the walls 40 are placed on the side of an outer circumferential end of the rotor 1. On the end face 23a of the rotor 1, the walls 40 are placed in a region from an intermediate portion between the rotation center and outer circumferential end of the rotor 1 to the outer circumferential end of the end face 23a. Note that the intermediate portion means not simply a midpoint between the outer circumferential end of the end face 23a and rotation center in terms of distance, but also means a position closer to the outer circumferential end than is the rotation center such that the rotated body can maintain a more stable posture than in the case of conventional techniques without inclining even when the rotated body causes an excessive amount of imbalance. Positions of the walls 40 are determined in advance by taking into consideration, for example, shape of the rotor 1, weight of the rotor 1, the center of gravity position G of the rotor 1, and whether there is any excessive amount of imbalance during rotation of the rotor 1. Here, the walls 40 are located at a position shifted, for example, approximately ¾ from the rotation center of the rotor 1. Front end portions (upper end portions) of all the walls 40 are positioned in such a way as to closely face the end face 23a of the rotor 1 when the rotor 1 is mounted on the mandrel 17. In the front end portions of the walls 40, plural ejection holes 43 are provided at equal intervals in a circumferential direction. Consequently, a fluid thrust bearing surface 45 is formed on a front end face of each wall 40. This makes up a fluid thrust bearing 47 adapted to support an end face portion on the side of the outer circumferential end of the end face 23a.

As shown in FIGS. 2 to 4, on an outer circumferential side of the mandrel 17, plural, e.g., four, feed passages 50 are formed along an axial direction. The feed passages 50 are placed at equal intervals at spots corresponding to the ejection holes 35 in the mandrel 17. All the feed passages 50 extend from near a front end portion of the fitting and inserting portion 33 to the installation seat 31, with a bottom portion placed on the front end side and an inlet portion placed on the side of the installation seat 31. Then, the ejection holes 35 are communicated with the respective feed passages 50. As shown in FIG. 2, the inlet portions of all the feed passages 50 are all connected to a hydrostatic-bearing fluid feeder 53 installed externally, through a relay passage 51 formed running from the support seat 40a into the support arm body 11. That is, a fluid such as compressed air is led from the hydrostatic-bearing fluid feeder 53 to each of the ejection holes 35. Consequently, the rotor 1 is supported from a radial direction by the fluid (air) ejected from the ejection holes 35.

As shown in FIGS. 3 and 4, in an axial portion of the fitting and inserting portion 33, a relief path 55 is provided to release the fluid (air) which has finished support in the radial direction to the outside. The relief path 55 is made up of a combination of, for example, a discharge passage 56 formed along an axis of fitting and inserting portion 33, plural, e.g., four, relief holes 57 provided at equal intervals in a circumferential direction in upper and lower parts of an outer circumferential surface of a middle portion 33c, and a discharge hole portion 59 provided in the installation seat 31. Of these, the relief holes 57 are communicated with the discharge passage 56. The discharge passage 56 is communicated with the discharge hole portion 59. The discharge hole portion 59 opens to the outside. Also, an upper end portion of the discharge passage 56 opens to a front end face of the fitting and inserting portion 33. Consequently, the fluid (air) ejected from the ejection holes 35 is led to the outside through the discharge passage 56 and discharge hole portion 59.

As shown in FIG. 2, the ejection holes 43 of the fluid thrust bearing 47 are connected to the hydrostatic-bearing fluid feeder 53 through feed passages 60 formed running, for example, from inside the walls 40 into the support seat 40a and a relay passage 61 formed in the support arm body 11. Consequently, the fluid (e.g., compressed air) supplied from the hydrostatic-bearing fluid feeder 53 is ejected from the ejection holes 43. That is, the rotor 1 is supported from a thrust direction by the fluid (e.g., compressed air) supplied from the hydrostatic-bearing fluid feeder 53 and the entire rotor 1 is floated by a predetermined amount. Consequently, the rotor is rotatably supported around the mandrel 17 while floating.

The amount of imbalance of the rotor 1 is measured using the support apparatus 15 configured as described above.

For that, first, the rotor 1 is mounted on the mandrel 17 by fitting the support hole 29 of the rotor 1 onto the mandrel 17 standing vertically as shown in FIGS. 1 and 2. Consequently, the fitting and inserting portion 33 of the mandrel 17 fits in the support hole 29 and the front end portions of the walls 40 face the end face portion on the side of the outer circumferential end of the rotor 1.

Subsequently, the fluid (e.g., compressed air) from the hydrostatic-bearing fluid feeder 53 is ejected through the ejection holes 35 in the mandrel 17 and the ejection holes 43 in the walls 40. Then, the fluid (e.g., compressed air) ejected through the ejection holes 35 in the mandrel 17 flows into space between the fluid radial bearing surfaces 36 and the inner surface of the support hole 29 as indicated by arrows in FIG. 2. The rotor 1 is rotatably supported around the mandrel 17 by the fluid which flows in.

Also, the fluid (e.g., compressed air) ejected through the ejection holes 43 in the walls 40 flows into space between the fluid thrust bearing surface 45 and end face 23a while pushing up the end face 23a of the rotor 1 as indicated by arrows in FIG. 2, and thereby causes the entire rotor 1 to float up a predetermined amount. Consequently, the rotor 1 is rotatably supported around the mandrel 17.

Subsequently, when a driving fluid is sprayed onto the blade 21 of floating rotor 1 from the pair of ejection heads 13, the rotor 1 rotates around the mandrel 17. Behavior (vibration condition) of the rotor 1 at this time is transmitted to the various sensors 12 via the support arm body 11 and vibration bridge body 7 and the amount of imbalance of the rotor 1 is measured.

Here, if the amount of imbalance of the rotor 1 is excessive, the rotor 1 inclines, making it difficult to measure the amount of imbalance.

However, because the rotor 1 is supported in the thrust direction by the fluid thrust bearing 47 in a wide region of an end face of the rotor 1 compared to an outside diameter of the rotor 1 rather than in a narrow region of an opening edge portion of the support hole 29 compared to the outside diameter of the rotor 1, support rigidity which can withstand an excessive amount of imbalance is secured for the rotor 1. Consequently, the behavior of the rotor 1 tending to incline under an excessive amount of imbalance is curbed. That is, the rotor 1 is kept in a stable upright posture without inclining.

Therefore, the amount of imbalance of the rotor 1 can always be measured with high accuracy, and the amount of imbalance can be measured accurately even if the amount of imbalance of the rotor 1 is excessive. The support apparatus 15 is effective particularly for a rotor prone to cause an excessive amount of imbalance (prone to incline), for example, a rotor 1 structured such that the support hole 29 is located below the center of gravity position G as shown in FIG. 2.

Moreover, any rotor 1 can be kept in a stable upright posture if positions of the ejection holes 43 of the fluid thrust bearing 47 (ejection positions of the fluid) are set close to the outer circumferential end of the end face 23a within the region from an intermediate portion between the rotation center and outer circumferential end of the rotor 1 to the outer circumferential end of the end face 23a. Note that, as described above, the intermediate portion means not simply a midpoint between the outer circumferential end of the end face 23a and rotation center in terms of distance, but also means a position closer to the outer circumferential end than is the rotation center such that the rotated body can maintain a more stable posture than in the case of conventional techniques without inclining even when the rotated body causes an excessive amount of imbalance. Of course, if the positions of the ejection holes 43 are shifted toward the outer circumferential edge like position X in FIG. 2 with increases in the outside diameter of the rotor 1, high-accuracy measurement of the amount of imbalance can be promised even for a rotor 1 prone to cause an excessive amount of imbalance.

Figure 5:
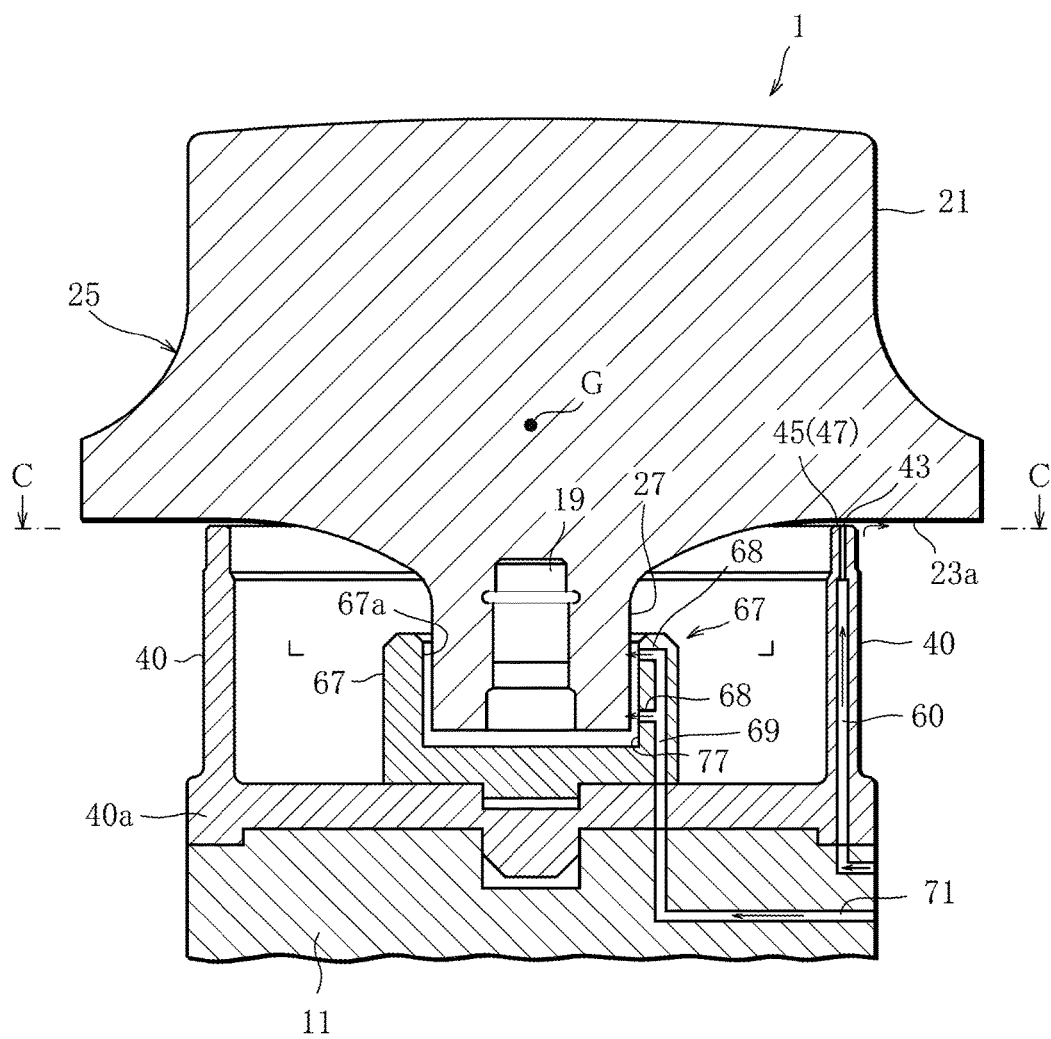
FIG. 5 is a sectional view showing a support apparatus for balance correction according to a second embodiment of the present disclosure.
Figure 6:
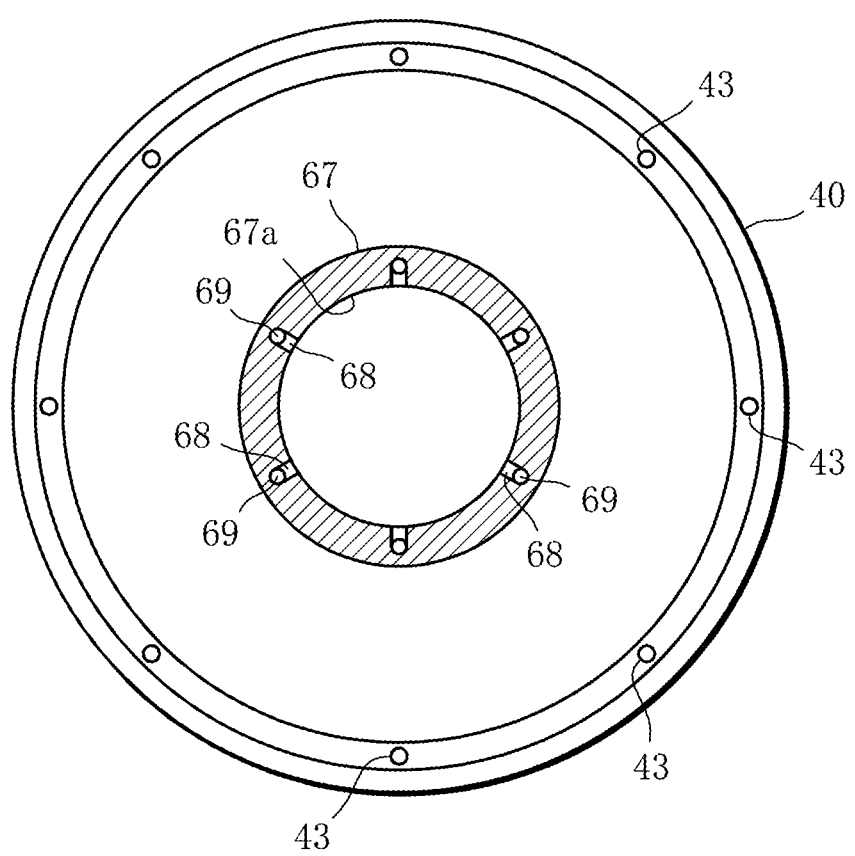
FIG. 6 a plan view partially cut away along line C-C in FIG. 5.

FIGS. 5 and 6 show a second embodiment of the present disclosure.

According to the present embodiment, the rotor 1 is radially supported by an outer side, i.e., the outer circumferential surface, of the boss 27, rather than by an inner side of the boss 27, i.e., the support hole 29.

That is, as the mandrel, a mandrel 67 whose front end portion is equipped with a circular recess 67a fittable over the outer circumferential surface of the boss 27 of the rotor 1 is used. In an inner circumferential surface of the recess 67a, plural, for example, ejection holes 68 are provided at equal intervals as shown in FIG. 6. The ejection holes 68 are connected to a hydrostatic-bearing fluid feeder (not shown) as with the first embodiment through feed passages 69 provided in a peripheral wall of the mandrel 67 and a relay passage 71 provided in the support arm body 11. This makes up a fluid radial bearing 77 adapted to rotatably receive the inner circumferential surface of the recess 67a using a radial bearing surface, i.e., rotatably receive the outer circumferential surface of the boss 27 using the fluid (e.g., compressed air) ejected from the inner circumferential surface of the recess 67a. Note that the fluid thrust bearing 47 has the same structure as the one described in the first embodiment.

By the adoption of the fluid thrust bearing 47 adapted to support the end face of the rotor 1 in the thrust direction, the support apparatus 15 adapted to radially support the outer circumferential surface of the boss 27 of the rotor 1 in this way also achieves effects similar to those of the first embodiment. However, in FIGS. 5 and 6, the same components as those in the first embodiment are denoted by the same reference numerals as the corresponding components in the first embodiment, and description thereof has been omitted.

It should be noted that the components and combination thereof described in the above embodiments are only exemplary, and, needless to say, components can be added, omitted, replaced, or otherwise changed without departing from the spirit of the present disclosure. Also, needless to say, the present disclosure is not limited by any embodiment, and is limited only by the "CLAIMS." For example, whereas a structure in which a fluid is ejected toward the outer circumferential edge of the end face of the rotor using arc-shaped walls has been cited in the embodiments described above, this is not restrictive and the fluid may be ejected toward the outer circumferential edge of the end face of the rotor using another structure. Also, an example in which the rotor of a turbocompressor is used has been cited in the embodiments described above, this is not restrictive and the present disclosure is applicable to any rotated body which needs measuring the amount of imbalance. Also, the fluid used may be either a compressible fluid such as air or an incompressible fluid such as lubricating oil.

What is claimed is:

1. A support apparatus for balance correction, the support apparatus comprising:
    a rotated body having an end face which is formed by an undersurface of a disk-shaped base portion in a direction intersecting a rotation center; and
    a fluid thrust bearing adapted to rotatable support the rotated body, wherein
    the fluid thrust bearing supports the rotated body at a position from an intermediate portion between the rotation center of the rotated body and an outer circumferential end of the base portion of the rotated body to the outer circumferential end on the end face of the rotated body.

2. The support apparatus for balance correction according to claim 1, further comprising a fluid radial bearing adapted to rotatably support the rotated body.

3. The support apparatus for balance correction according to claim 2, wherein the rotated body has a support hole provided in a central portion of the end face; and the fluid radial bearing rotatably receives an inner surface of the support hole.

4. The support apparatus for balance correction according to claim 3, wherein the fluid radial bearing includes a mandrel; and the fluid thrust bearing includes a wall surrounding the mandrel and ejects the fluid from an end portion of the wall to the end face of the rotated body and thereby floats the rotated body.

5. The support apparatus for balance correction according to claim 4, wherein: the mandrel includes a fitting and inserting portion fitted in the support hole; a fluid ejection hole is provided in an outer circumferential surface of the fitting and inserting portion; and a relief path for the fluid is provided in an axial portion of the fitting and inserting portion.

6. The support apparatus for balance correction according to claim 2, wherein: the rotated body has a boss provided in a central portion of the end face; and the fluid radial bearing includes a recess adapted to rotatably receive an outer circumferential surface of the boss.

7. The support apparatus for balance correction according to claim 6, wherein a fluid ejection hole is provided in an inner circumferential surface of the recess.

8. A support apparatus for balance correction, the support apparatus comprising:
    a rotated body which has an end face which is formed by an undersurface of a disk-shaped base portion in a direction intersecting a rotation center and has a support hole in a central portion of the end face;
    a vertical mandrel inserted into the rotated body from a vertical direction by being fitted in the support hole;
    a fluid radial bearing provided on an outer circumferential surface of the mandrel and adapted to rotatably receive an inner surface of the support hole of the rotated body by means of a fluid ejected from the outer circumferential surface of the mandrel; and
    a fluid thrust bearing placed around the mandrel and adapted to eject the fluid to a region from an intermediate portion between the rotation center of the rotated body and an outer circumferential end of the rotated body to the outer circumferential end on the end face of the rotated body and thereby float the rotated body.

9. A support apparatus for balance correction, the support apparatus comprising:
    a rotated body which has an end face which is formed by an undersurface of a disk-shaped base portion in a direction intersecting a rotation center and has a boss in a central portion of the end face;
    a vertical mandrel provided with a recess which allows fitting and insertion of the boss of the rotated body and inserted into the rotated body from a vertical direction by fitting between the boss and the recess;
    a fluid radial bearing provided in an inner circumferential surface of the recess and adapted to rotatably receive an outer circumferential surface of the boss by means of a fluid ejected from the inner circumferential surface of the recess; and
    a fluid thrust bearing placed around the mandrel and adapted to eject the fluid to a region from an intermediate portion between the rotation center of the rotated body and an outer circumferential end of the rotated body to the outer circumferential end on the end face of the rotated body and thereby float the rotated body.

* * * * *